May 31, 1960   H. V. SMITH ET AL   2,938,381
LIQUID METERING APPARATUS
Filed June 23, 1955   4 Sheets-Sheet 1
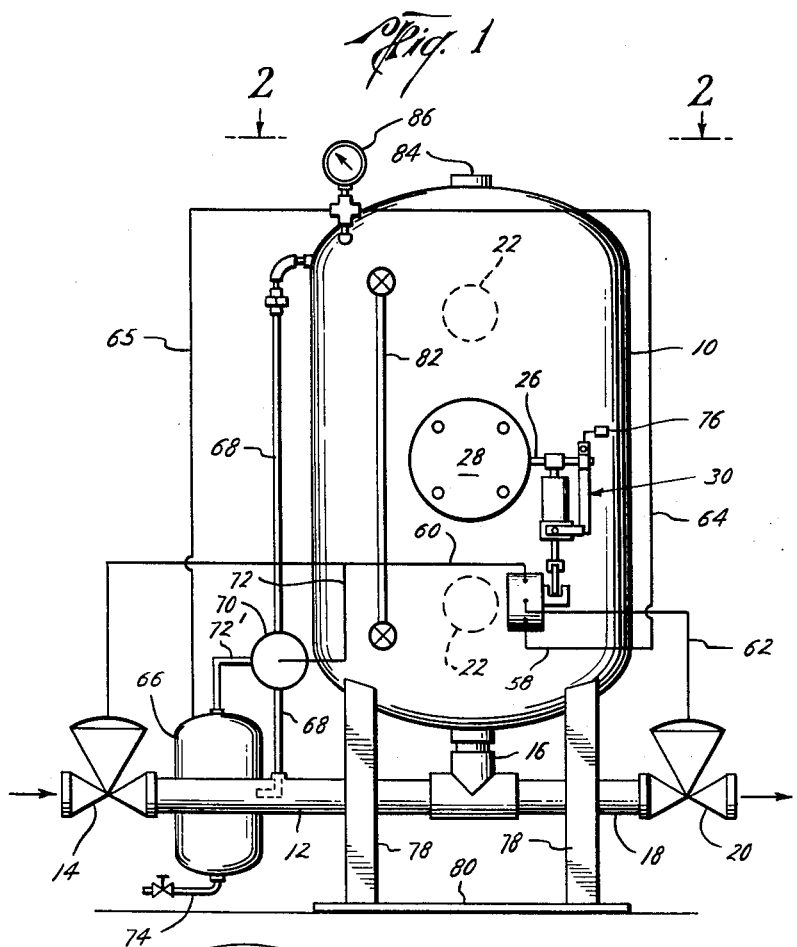
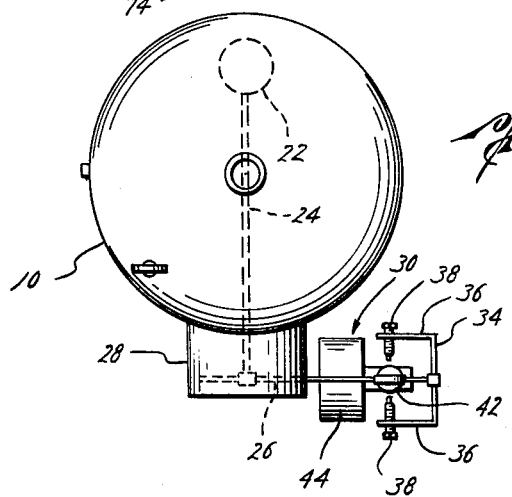
Horace V. Smith
George A. Repal
INVENTORS
BY James F. Weeler
Jefferson D. Giller
ATTORNEYS

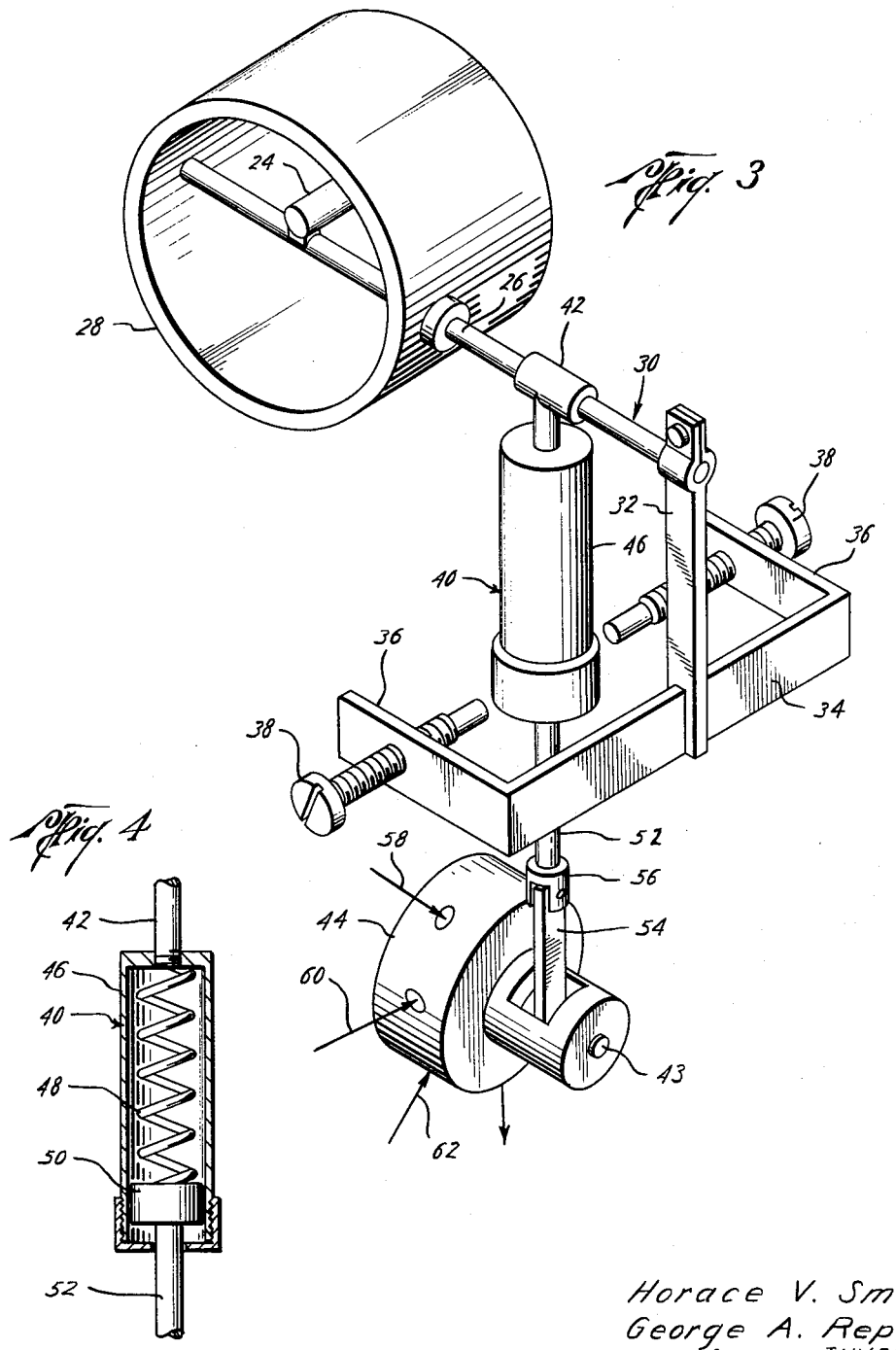

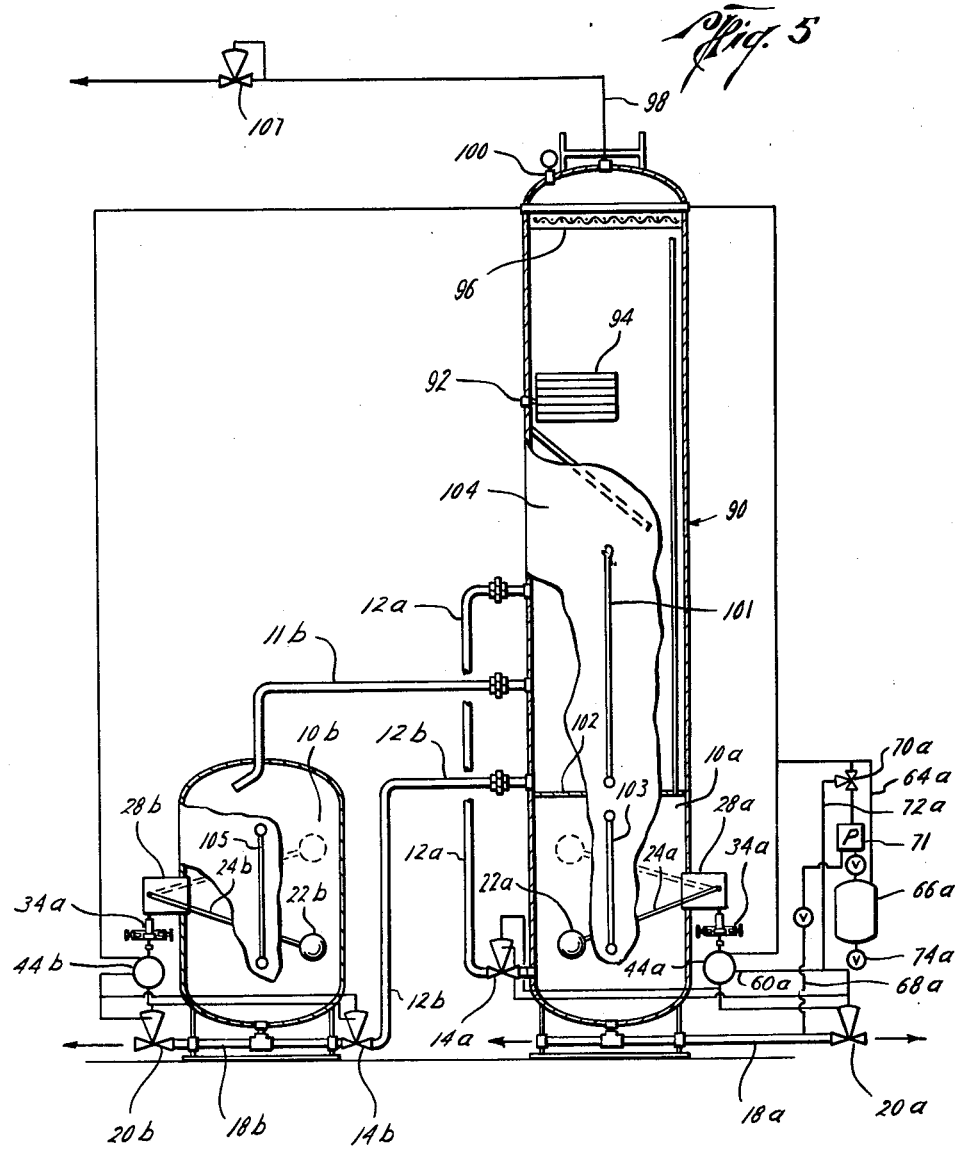

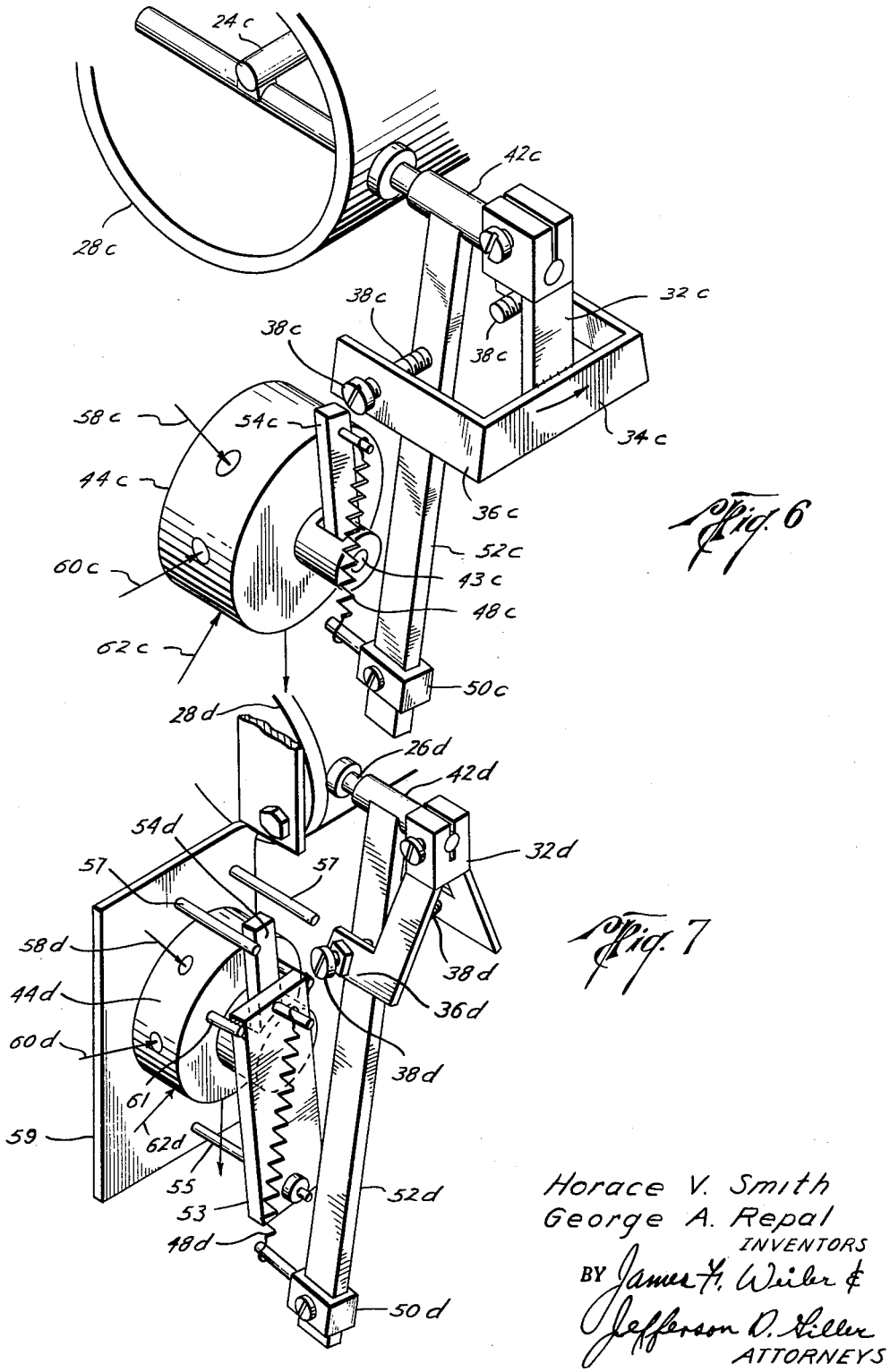

United States Patent Office 2,938,381
Patented May 31, 1960

2,938,381

LIQUID METERING APPARATUS

Horace V. Smith and George A. Repal, Houston, Tex., assignors to Oil Metering and Processing Equipment Corp., Houston, Tex., a corporation of Texas Filed June 23, 1955, Ser. No. 517,506

1 Claim. (Cl. 73—221)

The present invention relates to improved liquid metering apparatus and, more particularly, relates to improved liquid metering apparatus which may be used for accurately metering relatively large volumes of liquids under pressure such as in connection with oil and gas wells and gathering systems therefor.

There is a need for a relatively inexpensive and yet accurate and efficiently reliable metering vessel particularly for use in connection with metering oil and water from oil and gas wells or gathering systems therefor. There have been liquid metering apparatus proposed for this use; however, some of these apparatus do not function accurately when metering liquid under pressure and are not capable of accurately metering large volumes of liquid under these conditions. Some metering apparatus can function under pressure and with large volumes of flow; however, these metering apparatus are not as accurate as desired. In United States Patent No. 2,853,877, issued September 30, 1958, to Horace V. Smith for an invention in a Rigid Buoyancy Mass Liquid Meter, liquid metering apparatus is described and claimed which is highly accurate and efficiently reliable for the purposes mentioned. There is a need, however, for an accurate and reliable metering vessel which is relatively inexpensive and yet which is satisfactory for metering liquid in large volumes of flow and under pressure conditions for most purposes.

Accordingly, it is a major object of the present invention to provide an improved metering apparatus which is relatively inexpensive yet which efficiently and reliably meters large volumes of liquid under pressure such as in connection with metering oil and water from oil and gas wells and gathering systems therefor and the like as well as in other processes and operations where liquid is to be metered.

Yet a further object of the present invention is the provision of a metering apparatus of the character mentioned which may be incorporated into and form a part of a separator thus forming what might be termed a metering separator particularly suited for separation of liquid and gas and metering the liquid so separated which liquid may include oil or water or a mixture of the two.

Yet a further object of the present invention is the provision of a metering vessel of the character mentioned which includes a very simple pilot actuating mechanism by which the metering vessel may be calibrated from the outside without interrupting the operation of the metering vessel.

Yet a further object of the present invention is the provision of such a metering vessel in which the various control elements are all located outside the metering vessel so that repairs and the like may be made from the outside.

Other and further objects, features and advantages will be apparent from the following description of presently preferred examples of the invention, given for the purpose of disclosure and taken in conjunction with the accompanying drawings, where like character references designate like parts throughout the several views and where:

Figure 1 is a side elevation illustrating a presently preferred form of metering vessel according to the invention, Figure 2 is a plan view taken along the line 2—2 of Figure 1, Figure 3 is a perspective view illustrating a valve actuating mechanism according to the invention, Figure 4 is a fragmentary view illustrating a spring member forming a part of the valve actuating mechanism illustrated in Figure 3, Figure 5 is a side elevation, partly in section, illustrating the metering vessel in combination with an oil and gas separator for metering both oil and water separated in the separator, Figure 6 is a perspective view of a modified snap acting pilot assembly constructed according to the present invention, and Figure 7 is a perspective view of still another modified snap acting pilot assembly constructed according to the present invention.

Referring now to the drawings, and particularly to Figure 1, a metering vessel 10 is provided to receive a measured quantity of liquid for metering liquid flowing therethrough. As illustrated, the vessel 10 is generally cylindrically shaped and highly accurate and reliable results have been obtained by utilizing this particular shape of the metering vessel. If desired, however, Seraphin type necks of reduced diameter may be provided which extend above and below the upper and lower ends of the metering vessel 10 into which a float moves for increased sensitivity. Such reduced necks are known in the trade as Seraphin necks in view of the discovery by T. A. Seraphin, U.S. Patent No. 1,277,760, granted September 3, 1918. A vessel of this particular shape is disclosed in my copending application, referred to before, and is recommended by the ASME-API Petroleum P.D. Meter Code No. 1101. As mentioned, however, highly accurate and efficiently reliable results are obtained by the generally cylindrical metering vessel 10 although other shapes therefor may be used, as mentioned, such as a spherical vessel and the like.

A liquid inlet line 12 controlled by the inflow valve 14 is provided, which is connected to the flow line 16 extending into the metering vessel 10 at its lower portion. Similarly, the liquid outflow line 18 controlled by the outflow valve 20 is provided which is connected to the flow line 16. Thus, upon simultaneous actuation of the valves 14 and 20 liquid, such as oil, water or mixtures thereof, fills and drains from the metering vessel 10. As will be presently described, these valves are simultaneously controlled by valve actuating mechanism and the metering vessel may be calibrated to provide a highly accurate and efficient metering of liquid flowing into and out of the vessel 10.

Disposed within the metering vessel 10 is a float 22 which is rigidly connected to an arm 24, as best seen in Figure 2, which is secured to a pivotally mounted control arm 26 extending out of the flange 28 to the valve actuating mechanism generally indicated by the reference numeral 30. Thus, the float floats upon the liquid level and rises and falls therewith thereby causing a pivoting or swinging movement of the float arm 24 and a corresponding rotation of the control arm 26 for actuating the valve actuating mechanism 30.

Turning now to Figure 3, the valve actuating mechanism 30 includes a link or hanger 32 rigidly secured to the outer end of the control arm 26, to which link 32 is secured a generally U-shaped bracket 34. Disposed in the free ends 36 of the U-shaped bracket 34 are a pair of set screws 38 by which suitable adjustments may be made for calibrating the valve actuating mechanism, as will be presently described.

A spring loaded toggle 40 is rotatably mounted on the pivot rod 26, such as by the journal bearing 42 and is secured at its lower end to the pilot pin 43 for actuating the pilot 44.

The spring loaded toggle 40 includes a spring housing 46 into which is disposed the spring 48, as best seen in Figure 4, which yieldingly bears against the head or piston 50 of the toggle arm 52 connected to the toggle link 54 by the pin and clevis 56.

In operation of the control valve mechanism as the pivot rod 26 is rotated by means of the swinging motion of the float arm 24, a corresponding movement is transmitted to the arm 32 which in turn causes a corresponding movement to the U bracket 34. This causes the inner ends of the set screws 38 to engage the spring loaded toggle 40 and to cause it to move first in one direction and then in the other direction in response to the movement of the float and corresponding movement of the link just described. The spring action causes a snap action from one position to the other to insure a quick actuation of the valves.

Thus, as the pilot arm 54 is rotated or swung back and forth it causes a corresponding movement of the pilot pin 43 for actuating the valve 44. The valve 44 may be of any preferred type of which several are readily available on the commercial market. A satisfactory valve is Pilot Valve Model CFI–CI manufactured by the Clayton Valve Company (Cla-Val) of Alhambra, California. Accordingly, no detailed description thereof is deemed necessary.

A pressure line 58 supplies pressure to the pilot valve 44 from line 64, see Figure 1, and the pressure lines 60 and 62 extend from the pilot valve 44 to the inflow and outflow valves 14 and 20, respectively. Also, as best seen in Figure 1 a pressure equalizing line 65 extends to the sampler container 66 to provide a pressure equalization of the sampler system.

Turning again to Figure 1 a sampler is provided which includes an inflow line 68, a control valve 70 actuated by gas or air pressure in line 72 extending from pressure line 60. The sampler arrangement is so constructed and arranged to take a sample of liquid each time the vessel fills and drains. Thus, liquid, such as oil, water or mixtures thereof, flowing in the inflow line 12 also rises in the sample tube 68 to the same height as that in the vessel 10, the three-way valve 70 being in a position to permit such a flow rise. As soon as the vessel 10 has reached its upper liquid level for dumping, the valve 70 is actuated simultaneously with the valves 14 and 20 which causes the liquid in the sample tube 68 above the valve 70 to flow into the container 66 by means of line 72′, which sample container 66 is maintained under pressures of the order of the system by the pressure line 65. A valved drain 74 is provided so that sample may be removed from the sample container 66 or the sample container or bomb 66 may be removed from the unit and the sample analyzed under pressure. Thus, a sample is automatically collected for each metered volume of liquid.

A dump counter or recorder mechanism, of any preferred type, is provided and generally designated by the reference numeral 76, so that an accurate count is automatically maintained of each time the vessel 10 fills and empties. As mentioned, the counter 76 is diagrammatically illustrated, and any conventional counter or recorder mechanism may be used, a number of which are on the commercial market and, accordingly, no detailed description thereof is deemed necessary.

The metering vessel 10 may obviously be supported by any suitable framework or structure and, for this purpose, the supports 78 connected to the metering vessel 10 and the base ring 80 are illustrated.

In addition, a liquid level gauge 82 may be provided as well as the gas equalizing connection 84 and pressure gauge 86.

The operation of the liquid metering vessel of Figures 1–4, inclusive, is as follows. Liquid, such as oil, water or mixtures thereof, is permitted to enter inflow line 12 when valve 14 is open, which in turn flows in line 16 up into the interior of the metering vessel 10, the outflow valve 20 being closed. When the liquid in the vessel 10 reaches a predetermined level, in the upper portion of the metering vessel, the float 22 floating on the upper surface thereof during its upward rise reaches a point where it causes the arm 24 to rotate the pivot shaft 26 to such an extent that a set screw 38 engages the spring pressed toggle mechanism causing it to move. This in turn causes a rotation of the pilot pivot arm 43 which causes movement of the pilot valve 44 thereby providing pressure to the inflow valve 14 and draining pressure from the outflow valve 20 thereby causing a simultaneous closing and opening, respectively, of these valves. It is noted that the spring assembly prevents the pilot from "stalling" in a dead center position. Thus, the spring housing pivots when the float gets to the dumping point or filling point and the spring exerts a downward force on the pilot arm carrying it past the dead center position. This permits liquid in the metering vessel 10 to empty out the outflow line 18 until it reaches a predetermined minimum liquid level where the float 22 reaches the refilling point and reverses the valve actuating mechanism as previously described thereby causing a simultaneous closing of the outflow valve 20 and an opening of the inflow valve 14 thereby permitting liquid to again flow into the liquid metering vessel 10 thereby repeating the cycle. The counter 76 counts or records each time the vessel has been filled and emptied thereby giving an accurate indication thereof. In addition, as mentioned previously, the sampler valve 70 is also simultaneously actuated thereby collecting a sample of each quantity of liquid filling and emptying the liquid metering vessel 10.

It should be noted that the liquid may flow into the liquid metering vessel 10 in large volumes and under high pressures without interfering with the operation or the accuracy of the unit. Also, it should be noted that all calibration adjustments can be made outside of the vessel without interrupting the operation of the apparatus so that the metering vessel may accurately be calibrated or adjusted while in operation.

Turning now to Figure 5 a metering separator 90 is provided. In Figure 5 the reference letters "a" or "b" have been added to like or corresponding parts to those illustrated in Figure 1 for convenience of reference.

The metering separator 90 has the well fluid inlet 92 for introducing well fluid into the separator 90. A degassing element 94 is provided so that gas flows upwardly through a conventional screen or mist extracting element 96 and out the gas outlet line 98. A pressure gauge 100 is provided at the upper end of the separator 90 as well as a relief valve, not shown.

A partition 102 is provided in the vertical separator 90 thereby providing what might be termed a separating and liquid accumulating chamber 104 and a liquid metering chamber 10a therebelow. Thus, as oil and gas flows into the separating chamber 104, the gas flows out the outflow line 98 and the oil collects in the separating and accumulating chamber 104. A discharge line 12a, which also serves as an inflow line to the metering vessel 10a, supplies oil from the separating and liquid accumulating chamber 104 to the metering vessel 10a in response to actuation of the inflow valve 14a. Thus, the metering vessel in effect forms the lower portion of the separator 90. The discharge valve 20a also serves to permit emptying of the meter vessel 10a. Thus, as the pilot valve 44a is actuated in response to movement of the float 22a, the inflow and outflow valves 14a and 20a are simultaneously opened and closed, respectively, to permit a filling of the metering compartment 10a until the control is actuated at the upper level to cause simultaneous closing of the valve 14a and opening of the discharge valve 20a thereby causing a dumping of the vessel. When a predetermined lower liquid level is reached in the metering vessel 10a the discharge valve 20a is closed and the inlet valve is simultaneously opened and the metering vessel again fills. In the meantime, liquid has been accumulating in the separating and liquid accumulating chamber 104. This liquid now flows into the metering compartment 10a and the cycle is repeated. A counter or recorder keeps an accurate record of each time the metering vessel 10a fills and empties so that an accurate indication of the volume of liquid flowing through the metering separator is maintained.

The control mechanism and mode of operation are the same as that described in connection with Figures 1–4 and no more detailed description is deemed necessary.

If desired, the metering separator may also include means to separate water from the oil and gas flowing into the separator 90 and to this end an auxiliary metering vessel 10b for metering the water separated therefrom is provided. A discharge line 12b is located at the bottom of the separating and liquid accumulating chamber 104 which serves as an inflow line to the metering vessel 10b for metering water. A return or equalizing line 11b is provided at the upper end of the metering vessel 10b and is connected to the separating and liquid accumulating chamber 104 of the separator 90 above the water discharge and inflow line 12b for the metering vessel 10b. The various other controls, and valves are the same as used in connection with the metering vessels illustrated in Figure 1 and described in connection with Figure 5. In the metering vessel 10b, however, the float 22b is weighted so it will sink in oil and emulsion but will float in water.

Thus, in operation, if there is any water present in the oil and gas flowing into the separator 90, it will fall to the bottom of the liquid accumulator chamber 104 and, assuming the inflow valve 14b is opened and the outflow valve 20b is closed, the water will flow into the metering vessel 10b. This causes the float 22b to rise with the liquid level of water in the metering vessel 10b until such time as an upper level is reached thereby causing the valve actuating mechanism to close inflow valve 14b and open outflow valve 20b thereby permitting water to drain from the vessel 10b. Draining continues until a lower predetermined level is reached at which time the position of the valves are reversed thereby causing a refilling of the metering vessel 10b, all as previously described.

No oil is metered by the metering vessel 10b or discharged therefrom due to the fact that the oil floats on the surface of the water and will never be discharged from the metering vessel 10b due to the fact that the float 22b sinks in oil and emulsion. In the event there is very little water in the well fluid flowing into the separator 90, the metering vessel 10b will merely fill with oil and water and the oil will return in return line 11b to the liquid accumulating chamber 104 due to the fact that the float 22b does not float in oil. Until such time as there is a sufficient quantity of water in the metering vessel 10b to raise the float to the predetermined upper liquid level there will be no dumping of water from this vessel as previously mentioned. In this connection, the discharge 12a in the separation chamber 104 is placed at a height sufficient to permit a full accumulation of water for the water metering vessel 10b so that no water flows into the oil metering chamber 10a. In the event there is no water flowing into the separator 104, the oil will merely flow through the discharge line 12b, metering vessel 10b and return line 11b and accumulate in the separator and accumulating chamber 104 and then through discharge line 12a into the metering vessel 10a.

A modified sampler arrangement is illustrated in Figure 5 which functions off the discharge line 18a. The control valve 70a is connected by the pressure line 72a to the pressure line 60a from the pilot valve 44a. The control valve 70a admits and cuts off the supply of gas to the sample pump 71 for pumping liquid through the sample line 68a into the sample container 66a. As is the case in connection with the sampler of Figure 1 a pressure equalizing line 64a may be provided to the sample container 66a, although the sample may be collected at atmospheric pressure, and a valve drain 74a from the sample container 66a is provided. The sample may be removed to atmospheric pressure or the entire sample container or bomb 66a removed with pressure on it and the sample analyzed under pressure. Thus, each time the metering vessel 10a drains, a measured quantity of sample or a series of measured samples is pumped by the pump 71 into the sample container 66a and a representative sample is therefore collected each dump.

The pump 71 may be any of the commercial pressure responsive displacement pumps which are readily available on the market. The Texsteam chemical injector model 3700 available from Texsteam Corporation, P.O. Box 9127, Houston, Texas, is a satisfactory pump 71.

As illustrated, conventional gauge glasses 101, 103 and 105 are attached to the separator and accumulator chamber 104, metering vessel 10a and metering vessel 10b, respectively, and a back pressure valve 107 is provided in the gas discharge line 98. All other parts not specifically described are the same as those described in connection with Figures 1–4, inclusive, and no further description is deemed necessary.

While the invention has been applied to a vertical oil and gas separator it will be understood that it may also be applied to any desired separator or treating vessel, such as a horizontal type or other types if desired and, if desired, the metering vessel 10b for water may be omitted. In addition, either type sampler may be used on any of the embodiments, the particular arrangement being illustrated only for the purpose of disclosure and simplicity of description. Also, one or more of the metering apparatus may be used with treaters, separators or other apparatus; for example, two metering apparatus in combination with an emulsion treater or a separator, vertical or horizontal type, to meter the total production of oil and water and the ratio between the two.

Highly accurate results under all pressure conditions and volumes of flow have been obtained by metering vessels according to the invention. Also, the metering vessel may readily be calibrated or adjusted when in operation and efficiently reliable and accurate metering is provided to obtain measured quantities of liquid and to obtain a sample of the liquid in a completely automatic and continuous operation.

Referring now to Figure 6, a modification of the snap acting pilot is illustrated. In this view corresponding parts have the reference letter "c" added for convenience of reference. Turning now to this figure, the arm 52c extends from the bearing 42c and is connected to the pilot pivot arm 54c by means of the tension spring 48c. Thus, movement of the arm 52c causes the spring 48c to be moved and apply tension to the upper end of pilot pivot arm 54c until it snaps over thereby effecting a snap action pivoting of pilot pivot 43c. The spring 48c is connected to the lower end of the arm 52c by an adjustable nut 50c so that the tension in the spring 48c may be adjusted to obtain optimum operation of the snap acting pilot. Set screws 38c like set screws 38 in Figure 3 may be used to calibrate the dumping levels in metering vessel 10 with the left hand screw controlling the upper dumping level and the right hand screw controlling the lower dumping level. All other parts are the same as those previously described and no more description is deemed necessary.

Referring now to Figure 7, another modification of the snap acting pilot is illustrated. In this view corresponding parts have the reference letter "d" added for convenience of reference with new parts being designated by new numbers. Turning now to Figure 7, the arm 52d extends from the bearing 42d and is connected to a pivot arm 53 by means of the tension spring 48d. Pivot arm 53 pivots about the shaft 55 and has the projections 61 that contact pilot pivot arm 54d. Thus, movement of the arm 52d causes the spring 48d to be moved and applies tension to the pivot arm 53 until it snaps over. Pivot arm 53 moves the pilot pivot arm 54d from one position to another thereby effecting a snap acting pivoting of the pilot pivot arm 54d. A pair of stop pins 57 project on each side of the pilot pivot arm 54d from a plate 59 supporting the pilot valve 44d to stop movement of the pilot pivot arm 54d at the desired limits so that the force of the snap action of the pilot pivot arm 54d will not damage the pilot valve 44d. The spring 48d is connected to the lower end of the arm 52d by an adjustable nut 50d so that the tension in the spring 48d may be adjusted for optimum operation of the snap acting device. Screws 38d are used to calibrate the dumping range of the metering vessel. The two screws can be adjusted separately to control the upper and lower dumping levels in the metering vessel. All other parts are the same as previously described, and no more discussion is necessary.

If desired, of course, the sampler may be omitted altogether. In addition, numerous rearrangements of parts and substitution of parts will readily suggest themselves to those skilled in the art which are encompassed within the spirit of the invention and the scope of the appended claim.

While the present invention has been described in connection with metering oil, water and mixtures thereof, and in connection with a separator and treater, it will be understood that the invention may be used for metering any type of liquid or a number of liquids of different specific gravity and under any and all pressure conditions and in combination with various other apparatus in any process or operation where liquid is to be metered.

The present invention therefore is well suited to carry out the objects and attain the advantages and ends mentioned as well as others inherent therein. Accordingly, the invention is to be limited only by the spirit thereof and the scope of the appended claim.

What is claimed is:

In combination, for use in separating and simultaneously metering two liquids of different densities, a metering separator comprising a body including an upper separator chamber and a lower liquid metering container, means for introducing liquids and gas into the separator chamber, outlet means at an upper portion of the separator chamber for discharging gas therefrom, liquid outlet means in the separator chamber for discharging liquid therefrom, said liquid metering container having inlet and outlet passages including inlet and outlet valves therein, said inlet passage connected to said liquid outlet means from said separator chamber, a float in the liquid metering container adapted to float on the liquid therein, and a valve control mechanism actuated by movement of said float in one direction for simultaneously opening and closing the inlet and outlet valves, respectively, and for simultaneously closing and opening the inlet and outlet valves respectively, upon movement of said float in the other direction; and an additional liquid container having inlet and outlet passages and inlet and outlet valves therein, said last mentioned inlet passage connected to the lower portion of the separator chamber vertically spaced from the liquid outlet means in the separator chamber whereby a different liquid may enter each liquid container for metering, a return passage from an upper portion of the additional liquid container to the separator container at a point spaced above the inlet passage to the additional liquid container, a float in the additional liquid container adapted to float on liquid in the additional liquid container and to sink in liquid in the first mentioned liquid container, a valve control mechanism actuated by movement of said last mentioned float in response to change of level of liquid in which said last mentioned float will float, and a valve control mechanism actuated by movement in one direction of said float in said additional liquid container for simultaneously opening and closing the inlet and outlet valves in the additional liquid container, respectively, and for simultaneously closing and opening said last mentioned inlet and outlet valves, respectively, upon movement of said last mentioned float in the other direction.

References Cited in the file of this patent
UNITED STATES PATENTS

| | | |
|---|---|---|
| 901,190 | Riggs | Oct. 13, 1908 |
| 1,114,360 | Hornung | Oct. 20, 1914 |
| 2,158,381 | Raymond | May 16, 1939 |
| 2,211,282 | McKeever | Aug. 13, 1940 |
| 2,382,710 | Haddock | Aug. 14, 1945 |